United States Patent [19]

Perach

[11] Patent Number: 4,624,285
[45] Date of Patent: Nov. 25, 1986

[54] CONTROL VALVE ASSEMBLY

[75] Inventor: Asi Perach, Buffalo Grove, Ill.

[73] Assignee: United Technologies Automotive, Inc., Dearborn, Mich.

[21] Appl. No.: 740,692

[22] Filed: Jun. 3, 1985

Related U.S. Application Data

[63] Continuation-in-part of Ser. No. 523,909, Aug. 16, 1983, Pat. No. 4,538,645.

[51] Int. Cl.$^4$ ............................................. F16K 31/06
[52] U.S. Cl. ........................... 137/625.65; 251/129.05; 251/129.17
[58] Field of Search ............... 137/625.65; 251/129.05, 251/129.17

[56] References Cited

U.S. PATENT DOCUMENTS 2,750,961  6/1956  Uritis .......................... 251/129.05 X
4,304,391 12/1981  Yamaguchi ................ 251/129.17 X
4,538,645  9/1985  Perach ............................ 137/625.65

Primary Examiner—Robert G. Nilson
Attorney, Agent, or Firm—Gene D. Fleischhauer

[57] ABSTRACT

A control valve assembly 10 having a pair of axially opposed seats 54, 56 is disclosed. A poppet 66 is disposed in a control chamber 58 between the seats. The poppet is movable between the seats to establish an average pressure in the control chamber. The poppet is an integral portion of an armature 28. In one embodiment, the armature is urged in a first direction by a solenoid and in the opposite direction by a conical spring 76 which extends between the armature and a housing of the valve. In another embodiment, the armature has a spherical zone 94 on a convex surface 92 and a spring guide 84 engages the spring and has a concave surface which engages the spherical zone. In still another embodiment, means 310, such as diaphragms 312 or 314 or the slidable engagement 318, 320 between the housing 224 and the first end 251 of the armature are provided for radially positioning the armature as the armature is moved between the seats.

11 Claims, 5 Drawing Figures

CONTROL VALVE ASSEMBLY

CROSS REFERENCE TO RELATED APPLICATION

This is a continuation-in-part of U.S. application Ser. No. 523,909, filed Aug. 16, 1983, now U.S. Pat. No. 4,538,645, for Control Valve Assembly filed by Asi Perach.

DESCRIPTION

Technical Field

This invention relates to valves and more particularly to a control valve assembly for providing a controlled pressure or flow to an external device. The invention was developed in the field of electromagnetically operated valves, but the teachings herein are applicable to mechanically operated valves which operate at high frequency.

BACKGROUND OF THE INVENTION

An example of a valve for controlling differential flows and pressures is shown in U.S. Pat. No. 4,005,733 entitled Pressure Control Valve issued to John W. Riddel. The valve has a pair of axially spaced inlets in flow communication with a chamber; the chamber, in turn, is in fluid communication with a consumer for the pressurized fluid and flow. Pressure in the chamber or flow through the chamber is varied by an oscillating valve member which is movable to a first position which closes one inlet and opens the other and movable to a second position which opens the other inlet and closes the first inlet. The valve is solenoid operated and includes a valve member which acts as the solenoid armature. The solenoid armature is disposed entirely within the control chamber.

Another example of a high frequency valve is shown in U.S. Pat. No. 3,661,183 entitled Electromagnetically Operated Valve with Two Seats issued to Komaroff et al. In this valve, the valve member is disposed in a control chamber between two seats. Movement of the valve member results (in one direction) from a force exerted by an armature. The armature extends into the control chamber and is pressed against the valve member by a spring. Thus, the spring holds the valve member against one seat. The armature is retracted to a disengaged position from the valve member by a solenoid to allow fluid pressure to float the valve member to the other seat. As does the valve shown in U.S. Pat. No. 4,005,733, operation of this valve depends upon the pressure of the fluid at one port urging the valve member into engagement with the opposing valve seat.

The above art notwithstanding, scientists and engineers are seeking to develop a valve assembly which is operable at high frequency either mechanically or electromagnetically between two opposed seats and which is adapted to provide a variable pressure from a control chamber.

DISCLOSURE OF INVENTION

According to the present invention, a high frequency control valve employing a variable duty cycle has two valve seats spaced axially to leave a control chamber therebetween and has an armature having both a poppet disposed between the seats and a plunger spaced axially from the control chamber which is integrally joined to the poppet.

In accordance with one embodiment, the valve assembly includes an electromagnetic device to move the armature in a first direction and a conical spring which urges the armature in a second direction such that the poppet oscillates between the two seats.

In accordance with one embodiment of the present invention, the valve assembly includes means for radially positioning the armature from the housing as the armature moves between the valve seats.

In accordance with one specific embodiment, the means for radially positioning the armature is an annular diaphragm which extends from the housing to the armature at a location between the poppet and the plunger and which is radially aligned with the line of contact between the poppet and the seat.

A primary feature of the present invention is a valve assembly having a housing disposed about an axis Am. The housing includes a pair of axially opposed valve seats. The valve seats are spaced axially one from the other to define a control chamber within the housing. A supply port and an exhaust port are in fluid communication through the seats with the control chamber. A control port is in fluid communication with the control chamber. Another feature is an axially extending armature. The armature has a poppet disposed in the control chamber. The poppet is adapted to engage the two control seats to interrupt fluid communication between the port and the control chamber. Another feature of the armature is a plunger spaced axially from the control chamber. The plunger is integrally joined to the poppet. In one embodiment, the poppet is tapered toward the first seat and the second seat. A coil extends circumferentially about the armature to form a solenoid. A conical spring extends between the housing and the armature. The armature has a spherical zone. A spring guide engages the spring and has a frustoconical section that engages the spherical zone of the armature. The plunger of the armature is spaced from the housing leaving an axial gap therebetween which is greater than the movement of the poppet between the two seats. The housing has concentrations of magnetizable material spaced away from the axial gap by nearly equal distances. The plunger is radially spaced from the housing leaving between the housing and the armature a first radial gap for a first axial length of the armature and a second radial gap which is smaller than the first radial gap over a second axial length of the armature.

In one embodiment, the valve assembly includes means for radially positioning the armature from the housing such as a diaphragm extending from the housing to the armature. The diaphragm is radially aligned with the line of contact between the poppet and the valve seat. The diaphragm has a concave side facing the poppet for bounding the flow path for fluid extending through the valve seat. In another embodiment, the means for radially positioning the armature from the housing includes a cylindrical bore in the housing and a cylindrical projection on the armature at the end of the armature that is away from the plunger.

A primary advantage of the present invention is the power required to operate the valve and the mechanical response time which results from balancing the forces acting on the armature as the armature travels between positions at which the poppet engages first one seat and then the other seat. In particular, the stability of the poppet in the radial direction is improved by positively driving the poppet as a part of the armature in the axial direction between the seats which causes the inertia force of the armature to resist movement of the poppet in the radial direction. In one embodiment, stability is increased by the tapered configuration of the poppet and the aerodynamic interaction of the poppet with the fluid supplied to the control chamber. Stability is enhanced by the conical spring which resists radial movement of the poppet. Stability is further enhanced through balancing the forces exerted by the spring on the armature in the axial direction. Another advantage is the reduction in power which results from spacing the end of the plunger from the housing as compared with devices: which do not space the armature from the housing to reduce the effect that induced residual magnetism in the housing has on the free movement of the armature; which do not place the axial gap nearly midway between the magnetizable material of the housing to concentrate the lines of magnetic flux in the armature.

In one embodiment, an advantage is the power required to operate the valve assembly which results from isolating the end of the armature with a diaphragm from fluid flowed through the valve and balancing with the diaphragm the static pressure of the fluid on the armature. Another advantage is the stability of the poppet which results from radially positioning the armature with the diaphragm and employing radial static pressure forces to center the armature as the poppet moves from seat to seat. In one embodiment, an advantage is the electromagnetic performance of the valve which results from isolating the electromagnetic area of the valve from ferromagnetic particles in the fluid with a diaphragm extending from the housing to the armature.

Other features and advantages will be apparent from the specification and claims and from the accompanying drawings which illustrate an embodiment of the invention.

BEST MODE FOR CARRYING OUT THE INVENTION

Figure 1:
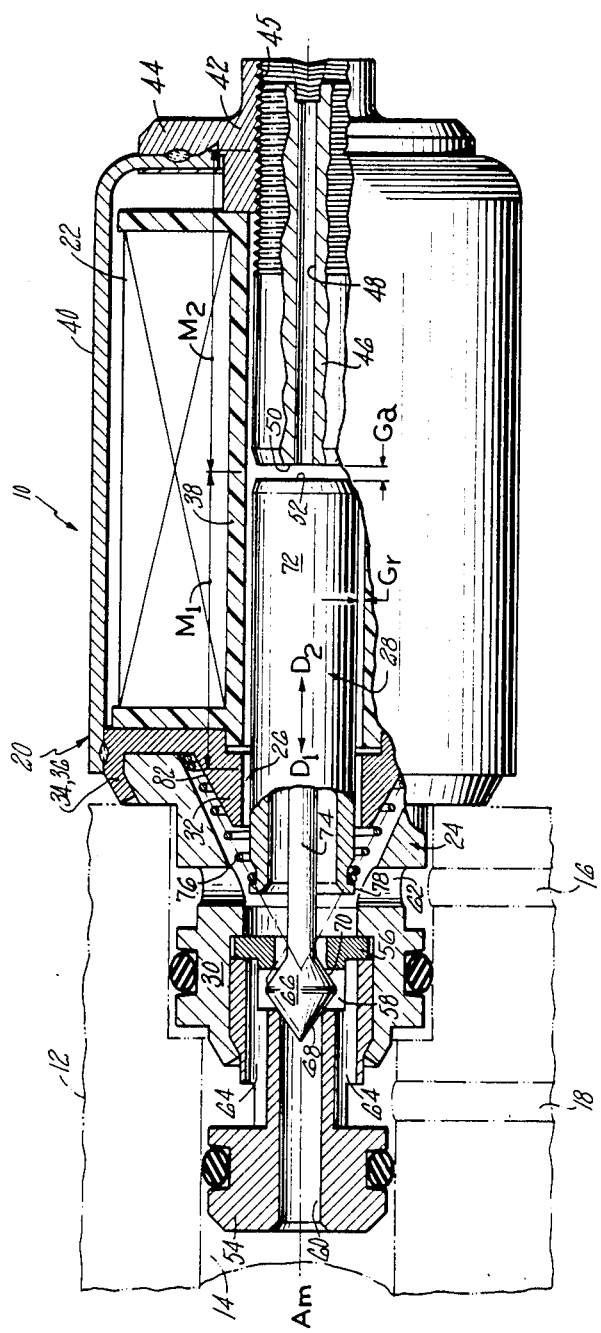
FIG. 1 is a side elevation view of a control valve assembly with a portion of the valve broken away and sectioned.

FIG. 1 is a side elevation view of a control valve assembly 10 disposed about an axis Am with a portion of the interior broken away and sectioned. A portion of the environment of the valve assembly, such as a block 12 of an automobile, is shown in phantom. The block includes a source of pressurized fluid, such as the supply passage 14 in fluid communication with a pump, for supplying the pressurized fluid to the control valve assembly. The block includes a region, such as the sump passage 16, which is in fluid communication with a reservoir. The sump passage is at a pressure lower than the pressure of the fluid in the supply passage. The control passage 18 places the control valve assembly in fluid communication with a device (not shown) requiring a flow of fluid at a pressure which varies with time.

The control valve assembly 10 includes a valve body 20 and an electromagnetic coil 22 which extends circumferentially about the valve body. The valve body has a housing 24 having a cavity 26. An armature 28 is disposed in the cavity. The armature is slidable in the housing along the axis Am of the valve assembly. The armature is shown as an element of an electromagnetic device and might equally be an element of a mechanically operated valve in which the armature is driven by mechanical means at a high frequency.

The housing 24 has a cage 30 which extends circumferentially about the axis Am. The cage adapts the housing 24 to engage the block 12. A first mass of magnetizable material, such as an adaptor 32, extends circumferentially about the axis Am. The adaptor is integrally joined to the cage by a fastening means 34, such as a tang 36 on the adaptor which is bent over the cage or a plurality of screws (not shown). A bobbin 38 extends circumferentially about the axis Am and engages the adaptor. The bobbin is formed of plastic, such as ULTM 2300, a polyetherimide resin fiberglass plastic available from the General Electric Corporation and adapts the housing to receive the wires of the electromagnetic coil 22. A shell 40 extends circumferentially about the exterior of the housing. The shell protects the coil from the environment and conducts magnetic flux in a closed magnetic circuit. A second mass of magnetizable material, such as the nut 42 having a tang 44, is integrally joined to the shell. The nut has a threaded hole 45 in the center of the nut. A pole piece 46 extends circumferentially about the axis Am and threadably engages the nut. The pole piece has a passage 48 which extends axially in the pole piece. The passage is in fluid communication with the exterior of the housing and thence with the sump reservoir of the block. The pole piece has an end 50. The armature has an end 52 which is spaced from the end 50 of the pole piece leaving an axial gap Ga therebetween. The gap Ga is midway between the first mass of magnetizable material, adaptor 32, and the second mass of magnetizable material, nut 42. The gap Ga is spaced a distance $M_1$ from the first mass and a distance $M_2$ from the second mass.

The housing further includes a first seat, such as a control seat 54, disposed in the cavity 26 of the housing. A second seat, such as an exhaust seat 56, is spaced axially from the control seat leaving a control chamber 58 therebetween. A first port, such as a supply port 60, is in fluid communication with the supply passage 14. The supply port is in fluid communication through the control seat with the control chamber. A second port, such as the exhaust port 62, is in fluid communication with the sump passage 16. The exhaust port is in fluid communication through the exhaust seat with the control chamber. A third port, such as the control port 64, is in direct fluid communication with the control passage 18 and is in fluid communication with the control chamber.

The armature 28 extends axially and circumferentially about the axis Am. The armature is capable of movement parallel to the axis Am in a first direction $D_1$ to a first position in which the armature engages the control seat 54. As shown by the broken lines, the armature is capable of movement in a second direction $D_2$ to a second position in which the armature engages the exhaust seat 56. The armature has a poppet 66 which is disposed in the control chamber and which is adapted by a first frustoconical surface 68 to engage the control seat and is adapted by a second frustoconical surface 70 facing in the second direction to engage the exhaust seat. The armature has a plunger 72 spaced axially from the poppet which is disposed in the cavity 26 and adjacent to the electromagnetic coil. A shaft 74 extends axially to integrally join the poppet to the plunger. The plunger is spaced radially from the bobbin leaving a radial gap Gr therebetween. The gap Ga between the armature and the pole piece 46 is in fluid communication with the fluid as it leaves the exhaust seat of the valve flowing to the sump passage 16 and thence to the sump reservoir. The sump reservoir (not shown) gathers the fluid for disposal or for return to the supply side of the control valve assembly.

A means for urging the poppet in the first direction, such as the spring 76, extends between the housing 24 and the armature 28. The armature is adapted by a circumferentially extending shoulder 78 to engage the spring. The adaptor 32 has a conical surface 82 inwardly of the spring. The spring has a tapered cross section of conical shape as shown by the broken lines which connect the center of the coils of the spring. This type of spring is referred to as a conical spring. Other tapered springs, such as a volute spring, or other nontapered springs may be utilized.

Figure 2:
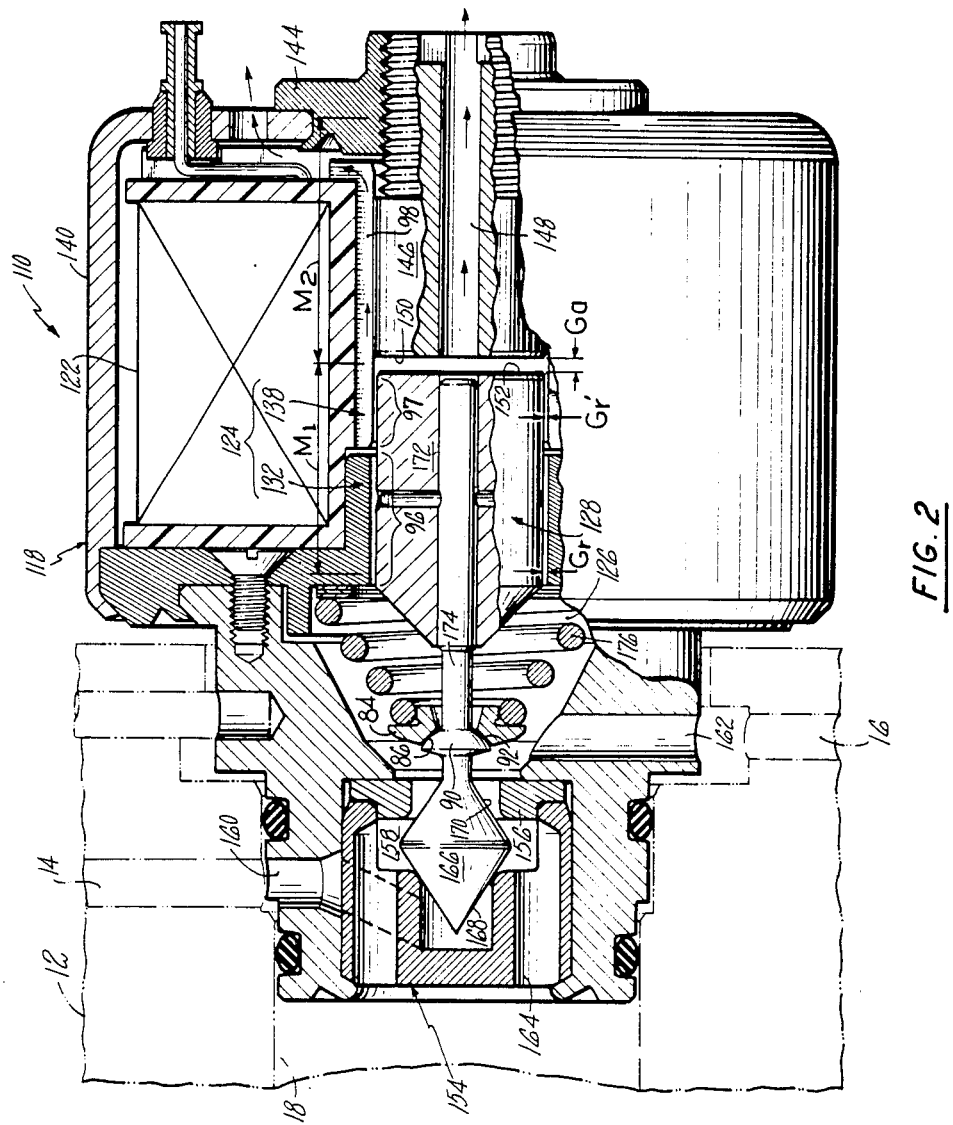
FIG. 2 is a side elevation view of an alternate embodiment of the control valve assembly shown in FIG. 1.
Figure 3:
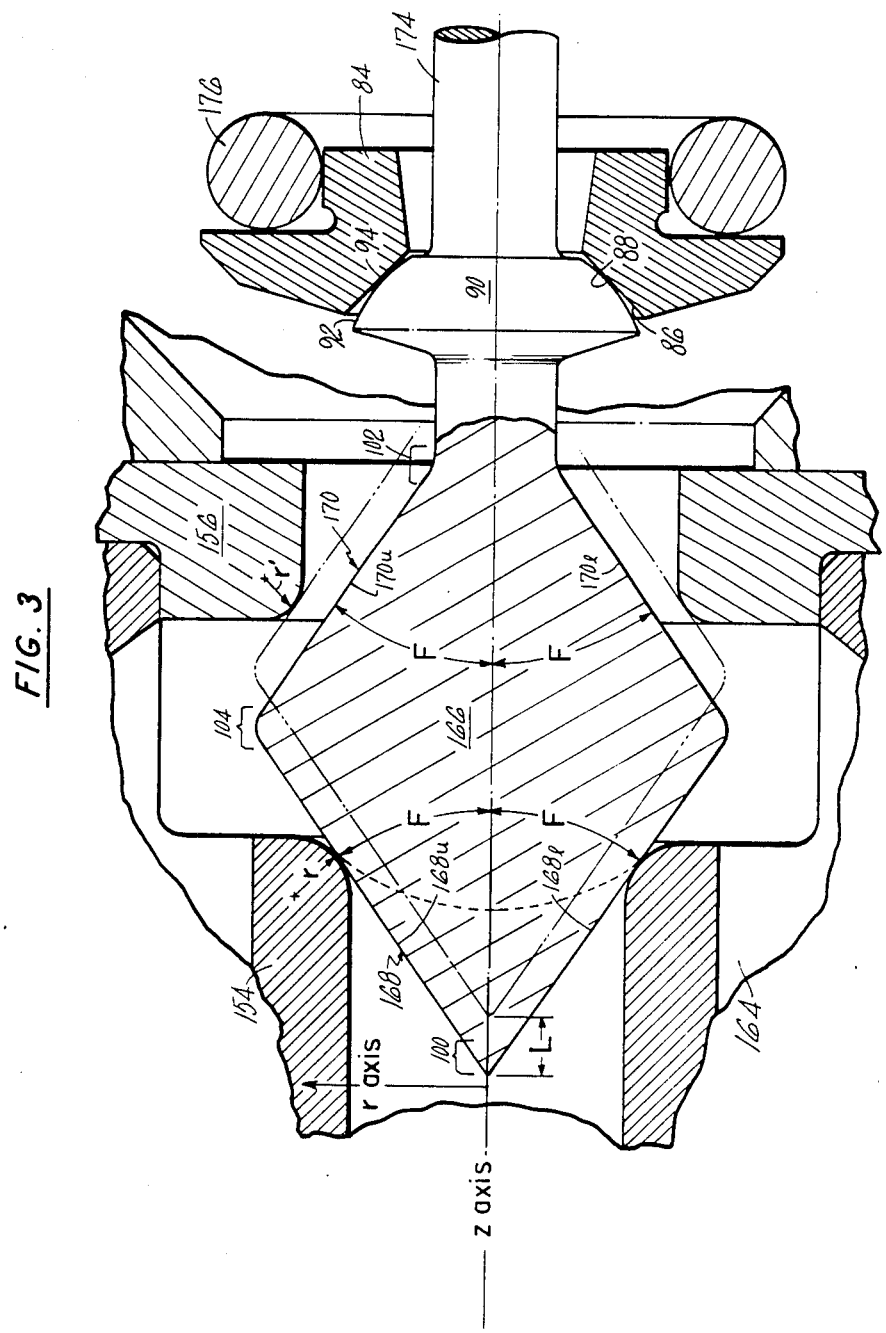
FIG. 3 is an enlarged view partly in section and partly in full of a portion of the control valve assembly shown in FIG. 2.

FIG. 2 is an alternate embodiment 110 of the control valve assembly shown in FIG. 1 having a means for urging the poppet in the first direction which includes a spring guide 84. As shown more fully in FIG. 3, the spring guide has a concave surface 86 facing in the first direction. The concave surface has a frustoconical portion 88 which adapts the spring guide to engage the shaft 174 extending between the plunger 172 and the poppet 166. As in the FIG. 1 embodiment, the shaft integrally joins the poppet to the plunger and has a collar 90 which extends circumferentially about the shaft. As shown in FIG. 2 and FIG. 3, the collar has a convex surface 92 at least a portion of which is a spherical zone 94. The spherical zone faces in the second direction and engages the spring guide in a ball joint type engagement.

A conical spring 176 extends between the spring guide and the housing to urge the plunger in the first direction. As with the conical spring 76, the conical spring 176 has a free length which is greater than the installed length.

The plunger 172 of the armature 128 which is disposed in the cavity 126 has a first axially extending portion 96 spaced radially from the housing 124 leaving a radial gap Gr therebetween. The armature also has a second axially extending portion 97 spaced radially from the bobbin 138 of the housing leaving a second radial gap Gr' therebetween which is smaller than the radial gap Gr. As with the embodiment shown in FIG. 1, the armature has an end 152 spaced axially from the pole piece 146 of the housing leaving a gap Ga therebetween. In addition to the passage 148 in the pole piece, the bobbin of the housing has four circumferentially spaced passages, as represented by the passage 98, which extend axially from the axial gap Ga to the exterior of the housing.

FIG. 3 is an enlarged view of the embodiment shown in FIG. 2 showing the poppet 166 and adjacent structure which includes the annular exhaust seat 156, the annular control seat 154, the spring guide 184 and the collar 190 on the shaft. As shown by the broken lines, the poppet moves a distance L from the control seat to the exhaust seat to engage the exhaust seat. The maximum axial gap Ga between the plunger and the pole piece is greater than the length L but less than twice the length L, (L<Ga<2L). As will be realized, the tapered shape of the poppet might result from a poppet having a circular cross section rather than having the frustoconical shape as shown.

The poppet 166 has a tip region 100, a base region 102 and a transition region 104 disposed between the tip region and the base region. The first surface 168 extends between the tip region and the transition region and is tapered toward the tip region. The second surface 170 extends between the transition region and the base region and is tapered towards the base region. As can be seen, the first surface has a first upper side $168_u$ and a first lower side $168_l$. The second surface has a second upper side $170_u$ and a second lower side $170_l$. A reference z-axis is coincident with the axis Am. In the tip region, a reference r-axis is perpendicular to the reference z-axis. The first upper side has a positive slope (dr/dz>0), the second upper side has a negative slope (dr/dz<0) and neither side has an inflection point. The absolute value of the slope of both sides lies in a range of twenty-six hundredths (0.26) to one hundred and nineteen hundredths (1.19). The first lower side and second lower side are mirror images of the first upper side and the second upper side. The first surface and the second surface are frustoconical in the region where the surfaces engage the control seats. The tip region is a conical surface which is coincident with the first surface. The included angle F between each frustoconical surface and the z-axis lies in a range of fifteen degrees to fifty degrees (15°<F<50°).

Figure 4:
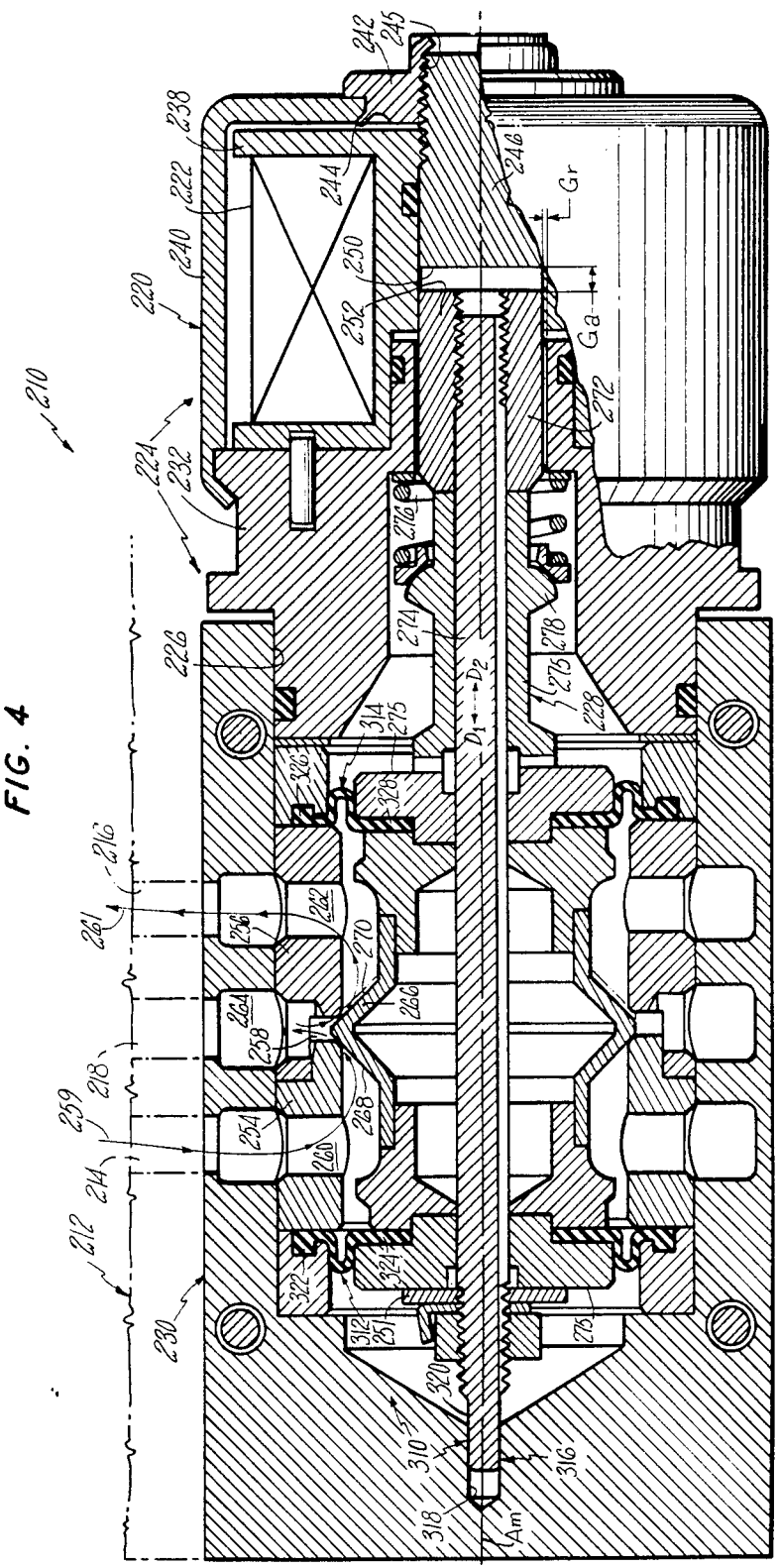
FIG. 4 is a side elevation view of an alternate embodiment of the central valve assembly shown in FIG. 1.

FIG. 4 is a side elevation view of an alternate embodiment 10 of the control valve assembly 210 with a portion of the interior broken away and sectioned. The control valve assembly 210 is disposed about an axis Am. A portion of the environment of the valve assembly, such as a block 212 of an automobile, is shown in phantom. The block includes a source of pressurized fluid, such as the supply passage 214 in fluid communication with a pump (not shown), for supplying the pressurized fluid to the control valve assembly. The block includes a region, such as the sump passage 216, which is in fluid communication with a reservoir. The sump passage is at a pressure lower than the pressure of the fluid in the supply passage. A control passage 218 places the control valve assembly in fluid communication with a device (not shown) requiring a flow of fluid at a pressure which varies with time.

The control valve assembly 210 includes a valve body 220 and an electromagnetic coil 222 which extends circumferentially about the valve body. The valve body has static structure, such as a housing 224, which has a cavity 226, and has movable structure, such as an armature 228, which is disposed in the cavity. The armature is slidable in the housing along the axis Am of the valve assembly. The armature is shown as an element of an electromagnetic device and might equally be an element of a mechanically operated valve in which the armature is driven by mechanical means at a high frequency.

The housing 224 has a cage 230 which extends circumferentially about the axis Am. The cage adapts the housing 224 to engage the block 212. Alternatively, the block 212 might form the housing. A first mass of magnetizable material, such as an adaptor 232, extends circumferentially about the axis Am. The adaptor is integrally joined to the cage by a fastening means, such as screws (not shown), which fasten the adaptor to the cage. A bobbin 238 extends circumferentially about the axis Am and engages the adaptor. The bobbin is formed of plastic, such as ULTM 2300, a polyetherimide resin fiberglass plastic available from the General Electric Corporation and adapts the housing to receive the wires of the electromagnetic coil 222. A shell 240 extends circumferentially about the exterior of the housing. The shell protects the coil from the environment and conducts magnetic flux in a closed magnetic circuit. A second mass of magnetizable material, such as the nut 242 having a tang 244, is integrally joined to the shell. The nut has a threaded hole 245 in the center of the nut. A pole piece 246 extends circumferentially about the axis Am and threadably engages the nut. The pole piece has an end 250. The armature has a first end 251 and a second end 252. The second end is spaced from the end 250 of the pole piece leaving an axial gap Ga therebetween. The gap Ga lies between the first mass of magnetizable material, adaptor 232, and the second mass of magnetizable material, nut 242.

The housing further includes a first seat, such as a control seat 254, disposed in the cavity 226 of the housing. A second seat, such as an exhaust seat 256, is spaced axially from the control seat leaving a control chamber 258 therebetween. A first flow path for fluid 259 extends through the control seat to the control chamber. A first port, such as a supply port 260, is in fluid communication with the supply passage 214 and in fluid communication with the control chamber along the first flow path through the control seat. A second flow path for fluid 261 extends through the exhaust seat from the control chamber. A second port, such as the exhaust port 262, is in fluid communication with the sump passage 216. The exhaust port is in fluid communication along the second flow path through the exhaust seat with the control chamber. A third port, such as the control port 264, is in direct fluid communication with the control passage 218 and is in fluid communication with the control chamber.

The armature 228 extends axially and circumferentially about the axis Am. The armature is capable of movement parallel to the axis Am in a first direction $D_1$ to a first position in which the armature engages the control seat 254. As shown by the broken lines, the armature is capable of movement in a second direction $D_2$ to a second position in which the armature engages the exhaust seat 256. The armature has a poppet 266 which is disposed in the control chamber and which is adapted by a first frustoconical surface 268 to engage the control seat and is adapted by a second frustoconical surface 270 facing in the second direction to engage the exhaust seat. The relationship of the poppet to the control seat and the control seat to the poppet is as described with respect to the poppet shown in FIG. 3.

The second end 252 of the armature has a plunger 272 spaced axially from the poppet. The plunger is disposed in the cavity 226 and adjacent to the electromagnetic coil. A shaft 274 extends axially to integrally join the poppet to the plunger. The shaft includes spacers 275 for positioning the poppet which are integrally joined together with the poppet. The plunger is spaced radially from the bobbin leaving a radial gap Gr therebetween.

A means for urging the poppet in the first direction, such as the spring 276, extends between the adaptor 232 of the housing 224 and the armature 228. The armature is adapted by a circumferentially extending shoulder 278 to engage the spring. The relationship between the spring and the armature is of the type shown in FIG. 3.

The control valve assembly 210 includes means 310 for radially positioning the armature from the housing. Examples of such means include a first annular diaphragm 312, a second annular diaphragm 314, and means 316 for adapting the housing to slidably engage the first end 251 of the armature 228 in the axial direction and to restrain the first end of the armature against movement in the radial direction. In the embodiment shown, the means 316 includes a cylindrical bore 318 which adapts the housing to slidably engage the armature. The armature has a cylindrical projection 320 which extends into the cylindrical bore and which adapts the armature to slidably engage the housing in the axial direction. An alternate construction might include a bore on the armature which engages a projection on the housing.

The first annular diaphragm 312 has an outer portion 322 which is attached to the housing 224. An inner portion 324 of the diaphragm is attached to the armature 228 at a location between the poppet 266 and the first end 251 of the armature. The diaphragm extends circumferentially about the axis Am between the armature and the housing to bound the first flow path 259 for fluid and to block the fluid from contacting the first end of the armature.

The second annular diaphragm 314 has an outer portion 326 which is attached to the housing 224. An inner portion 328 of the second annular diaphragm is attached to the armature 228 between the poppet 266 and the second end 252 of the armature. The diaphragm extends circumferentially about the axis Am between the armature and the housing to bound the second flow path for fluid and to block the fluid from contacting the plunger 272 on the second end 252 of the armature.

One suitable material for the diaphragms is formed of a nitrile elastomer and Dacron fiber. This elastomeric combination is available from the Bellofram Corporation, 30 Blanchard Road, Burlington, Mass. Another elastomeric material is formed of a flurosilicone elastomer and Nomex or Fiberglass fibers. This elastomeric combination is available from the DuPont Corporation.

Figure 5:
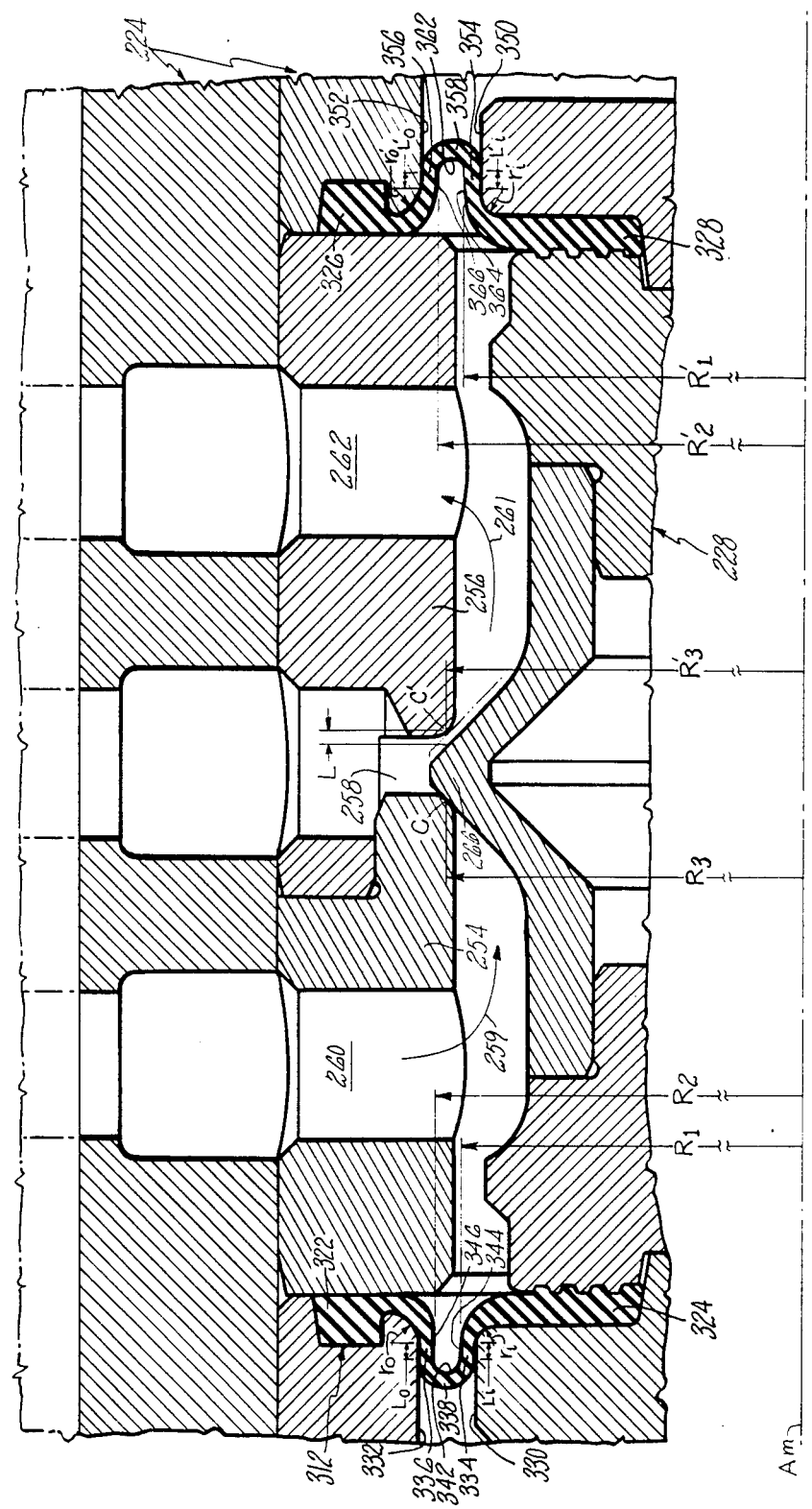
FIG. 5 is an enlarged view of a portion of the control valve assembly shown in FIG. 4.

FIG. 5 is an enlarged view of a portion of FIG. 4. As shown in FIG. 5, the armature 228 has a first surface 330 which extends circumferentially about the axis Am of the control valve assembly. A first surface 332 on the housing extends circumferentially about the axis Am and is parallel to the first surface 330 of the armature. The control valve assembly is adapted such that as the armature moves back and forth between the first seat and the second seat, the first surface of the housing moves parallel to the first surface of the armature.

The first annular diaphragm has an inner wall 334 which is attached to the inner portion 324 of the diaphragm. An outer wall 336 is attached to the outer portion 322 of the diaphragm. A curved section 338 of the diaphragm extends between the walls and has a concave side 342 which faces the poppet 266. The inner wall has a side 344 which faces the outer wall. A radius $R_1$ extends from the axis Am to the side 344 of the inner wall. The outer wall has a side 346 which faces the side 344 of the inner wall. A radius $R_2$ extends from the axis Am to the side 346 of the inner wall.

A part $L_i$ of the inner wall extends parallel to the first surface 330 of the armature 228 and engages the first surface of the armature. The length of $L_i$ is equal to or greater than the length L which is the distance that the poppet travels in the axial direction between the first seat and the second seat. The outer wall 336 has a part $L_o$ which extends parallel to the part $L_i$ of the inner wall and which engages the first surface 332 of the housing. The length of $L_o$ is equal to or greater than the length L which is the distance that the poppet moves between the seats in the axial direction.

The poppet 266 has a line of contact C with the first seat 254. The line of contact C lies on a radius $R_3$ which extends about axis Am. As shown, the first annular diaphragm is radially aligned with the line of contact C. The diaphragm is positioned so that cylinders formed by the radius $R_1$ to the side 344 of the inner wall and the radius $R_2$ to the side 346 of the outer wall bracket the cylinder formed by the radius $R_3$ of the line of contact C. This radially aligns the first annular diaphragm with the line of contact between the poppet and the first seat. Preferably, the radiuses are selected so that the area between the cylinders $R_3$ and $R_1$ is equal to the area between the cylinders $R_2$ and $R_3$, that is, $$\pi(R_3^2 - R_1^2) = \pi(R_2^2 - R_3^2).$$

The armature has a second surface 350 which extends circumferentially about the axis Am of the control valve assembly. A second surface 352 on the housing 224 extends circumferentially about the axis Am and is parallel to the second surface 350 of the armature. The control valve assembly is adapted such that as the armature moves back and forth between the first seat and the second seat, the second surface of the housing moves parallel to the second surface of the armature.

The second annular diaphragm has an inner wall 354 which is attached to the inner portion 328 of the diaphragm. An outer wall 356 is attached to the outer portion 326 of the diaphragm. A curved section 358 of the diaphragm extends between the walls and has a concave side 362 which faces the poppet 266. The inner wall has a side 364 which faces the outer wall. A radius $R_1'$ extends from the axis Am to the side 364 of the inner wall. The outer wall has a side 366 which faces the side 364 of the inner wall. A radius $R_2'$ extends from the axis Am to the side 366 of the inner wall.

A part $L_i'$ of the inner wall extends parallel to the second surface 350 of the armature 228 and engages the second surface of the armature. The length of $L_i'$ is equal to or greater than the length L which is the distance that the poppet travels in the axial direction between the first seat and the second seat. The outer wall 356 has a part $L_o'$ which extends parallel to the part $L_i'$ of the inner wall and which engages the second surface 352 of the housing. The length of $L_o'$ is equal to or greater than the length L which is the distance that the poppet moves between the seats in the axial direction.

The poppet 266 has a line of contact C' with the second seat 256. The line of contact C' lies on a radius $R_3'$ which extends about axis Am. As shown, the first annular diaphragm is radially aligned with the line of contact C'. The diaphragm is positioned so that cylinders formed by the radius $R_1'$ to the side 364 of the inner wall and the radius $R_2'$ to the side 366 of the outer wall bracket the radius $R_3'$ of the line of contact C'. This radially aligns the first annular diaphragm with the line of contact between the poppet and the first seat. Preferably, the radiuses are selected so that the area between the cylinders $R_3'$ and $R_1'$ is equal to the area between the cylinders $R_2'$ and $R_3'$, that is, $$\pi(R_3^2 - R_1^2) = \pi(R_2^2 - R_3^2).$$

During operation of the control valve assembly 10 shown in FIG. 1, a pressurized fluid is supplied via the supply passage 14 to the supply port 60.

Electrical energy is supplied to the coil 22. The coil in combination with the pole piece 46 and the armature 28 forms a solenoid. An electromagnetic force results from the electrical energy. The force is exerted on the plunger 72 causing the plunger to overcome the force exerted by the spring 76. The plunger causes the armature to move from the first position towards the second position. As the valve moves from the first position, where it engages the control seat 54, to the second position, where it engages the exhaust seat 56, the pressurized fluid enters the control chamber 58 causing the pressure of the control chamber to increase.

The pressure in the control chamber 58 continues to rise until the solenoid is de-energized and the spring force exerted by the spring overcomes the magnetic force exerted by the electromagnetic field associated with the solenoid and the hydraulic drag and inertial forces associated with the armature. The plunger 28 begins to move from the second position to the first position, placing the control chamber in fluid communication through the exhaust seat with the exhaust chamber. Because the exhaust chamber is at a pressure lower than the pressure in the supply chamber, the pressure in the control chamber begins to drop. The pressure in the control chamber is transmitted via the control port 64 and control passage 18 to a device requiring the control pressure.

The armature 28 of the control valve is reciprocated at a high frequency, (that is, many cycles each second) so that the pressure available from the control chamber does not fluctuate widely.

In fact, for the valve shown, the valve operates at a minimum frequency of twenty (20) cycles per second with a maximum frequency of operation that exceeds a hundred (100) cycles per second.

The pressure in the control chamber is a function of the duty cycle. The duty cycle at a particular seat is the ratio of the period of time at that seat to the period of time for the plunger to leave that seat and return to the seat during one cycle of operation. The duty cycle sets the average pressure within the chamber at some value between the supply pressure and the sump pressure. Were the plunger to remain in the first position at all times, the pressure would equal the sump pressure. Were the plunger to remain in the second position at all times against the exhaust seat, the pressure in the control chamber would equal the supply pressure.

As the poppet cruises from one seat to the other in the control chamber, it is important that the poppet exhibit good stability in the radial direction. The stability of the poppet is improved by positively driving the poppet in the axial direction between the seats with the plunger as an integral portion of the armature. The inertia force of the armature (rate of change of momentum) moving in the axial direction resists movement of the poppet in the radial direction which might result from fluctuations in radial forces acting on the plunger. These radial forces primarily result from hydraulic forces, variations in fluid pressure within the control chamber, and momentum forces linked to the change in momentum of the fluid as the fluid flows through the chamber, changing in both directions and speed.

While the complex interaction of forces between the poppet of the armature and the fluid in the chamber is not a well understood phenomenon, one of the most stable constructions is believed to be a poppet having tapered surfaces which face each of the seats. The angle of the surface with respect to the z-axis lies in a range of from fifteen degrees to fifty degrees ($15° < F < 50°$). As the angle F becomes smaller and smaller, the length L of the plunger stroke increases. Because of the greater length to move the armature the required distance between the first position and the second position, the operating frequency of the valve is adversely affected. As the angle F becomes larger and larger, the hydraulic drag increases, increasing the amount of spring force needed to move the plunger from the second position to the first position, and increasing the amount of electromagnetic force needed to move the plunger from the first position to the second position. A poppet, such as the spherical poppet shown by the broken lines might be used, for example, where concerns of drag force are not as great as concerns for the amount of distance that the armature must move.

The air gap Ga is spaced a nearly equal distance between the first mass of magnetizable material, adapter 32, and the second mass of magnetizable material, nut 42, for concentrating the lines of flux acting through the pole piece and the armature to most efficiently use the power utilized by the solenoid. Ideally, the air gap Ga is located at the point where the magnetic flux density is at its greatest value and causes the greatest force to act on the armature. Theoretically, for identical masses of the same magnetizable material, this point is exactly half the total distance between the masses of magnetizable material. As shown in FIG. 1, the distance $M_1$ is nearly equal to the distance $M_2$. Ideally, the maximum air gap would be a minimum clearance equal to the length of the stroke L to utilize the magnetic force to a maximum. However, residual magnetism induced in the pole piece restrains the plunger as the plunger moves in response to the spring force from the second position to the first position. Accordingly, a small gap is provided to decrease the effect that this residual magnetism has on movement of the plunger. It is believed that an axial gap Ga which is greater than the stroke length L but less than twice the stroke length L is suitable to balance these concerns. If residual magnetism is not a concern, the maximum air gap Ga may grow very small and approach the value of L, the stroke length of the poppet.

Operation of the alternate embodiment shown in FIG. 2 is similar to the operation of the embodiment shown in FIG. 1. The alternate embodiment is provided with the spring guide 84 and collar 90 on the shaft to accommodate tolerate variations in the conical spring. As a result of these tolerance variations, the coil engaging the spring guide is often not in the same plane as the coil of the spring which engages the housing. This causes the spring to exert a slightly uneven force in the axial direction on the spring guide. The spring guide acts as a ball joint, shifting on the spherical zone as it seeks to balance the axial forces acting on the spring guide and thus on the armature thereby reducing the unbalanced couple of forces which exerts a moment force pushing the armature and the poppet in the radial direction.

In the control chamber, the annular exhaust seat and the annular control seat are contoured with a spherical zone (respectively of a radius r, r' with $r > r'$) to provide line to line contact between the poppet and the seats.

The radial gap Gr' between the plunger and the housing is reduced adjacent to the plastic bobbin to provide a more certain axial guide to the plunger than is provided by the radial gap Gr. Lubricating fluid is provided to both gaps by ducting a portion of the fluid from the exhaust chamber through the radial gaps to the air gaps Ga. The air gap Ga is in fluid communication with the four equally spaced grooves which extend in the bobbin to the exterior of the housing to provide positive lubrication to the plunger as the plunger reciprocates and yet to reduce the resistance to movement of the plunger which might result from the flow of the lubricating fluid to and away from the gap Ga between the plunger and the pole piece as the armature oscillates between the first position and the second position.

Operation of the alternate embodiment shown in FIG. 4 is similar to the operation of the embodiments shown in FIGS. 1 and 2. The FIG. 4 embodiment has additional means 310 for radially positioning the armature from the housing as the armature moves between the two seats under operative conditions. These additional means include two annular diaphragms 312, 314 and the slidable engagement 318, 320 between the housing 224 and the first end 251 of the armature 228. The slidable engagement permits axial movement of the armature between the two seats and, at the same time, restrains the armature against radial movement.

As the fluid is flowed along the first flow path 259 from the supply port 260 to the control chamber 258, the first annular diaphragm 312 blocks fluid from contacting the slidable engagement 318, 320 between the housing and the armature. This avoids fluidic drag forces which occur as fluid is pumped in and out of the bore and as the first end 251 of the armature moves through the fluid. Avoiding these drag forces is especially beneficial during low temperature operation with viscous fluids whose viscosity decreases with temperature.

The second annular diaphragm 314 performs the same function at the second end 252 of the armature, blocking fluid flowed along the second flow path 261 from contacting the plunger and entering the area of the electromagnetic coil 222. In addition to avoiding fluidic drag forces acting on this end of the armature, a second benefit occurs. The fluid which is flowed from the control valve to an external device, such as an automotive transmission, often returns contaminated with small ferromagnetic particles or other metallic particles having magnetic properties. These metallic particles can hinder the electromagnetic operation of the valve, if they enter electromagnetic area of the valve. These fluidic particles are blocked from affecting the operation of the valve by placing the second annular diaphragm between the second flow path and the electromagnetic portion of the valve.

Each diaphragm performs a second important function. The diaphragms, by reason of their orientation with respect to the line of contact of the poppet against either valve seat, balance the static pressure forces acting on the armature. Thus, the static pressure forces act on the diaphragm in the axial direction to balance the static pressure forces acting on the armature. The diaphragm and the static pressure forces acting on the diaphragm in the radial direction tend to position the armature and resist movement of the armature in the radial direction as the armature is oscillated between the seats.

The fillet radiuses at the surfaces 330, 332 and 350, 352, such as radii $r_i$, $r_o$ and $R_i'$, $r_o'$, reduce the shearing stresses in the diaphragms at these surfaces. The thickness of the walls of the diaphragms are increased at this location to further reduce shearing stresses in the diaphragm. The parallel surfaces engaging each diaphragm, such as the surface 330 on the housing, and 334 on the armature at the first diaphragm, and the lengths $L_o$ and $L_i$ of the parallel walls of the diaphragm with respect to the length of travel L of the poppet cause the walls of the diaphragm to follow preselected parallel paths as the armature oscillates between seats. As a result, the curved section 338 of the diaphragm forms a half circle which reduces shearing stresses in the curved section and the parallel ports of the walls of the diaphragm with the major stresses being those caused by tension. Another result of using the parallel diaphragm walls connected by a curved section is to promote rolling of the diaphragms on the surfaces 330, 332 over sliding on the surfaces as the armature oscillates between seats. As a result, the diaphragm experiences more rolling friction and less sliding friction in comparison to constructions where more sliding of the diaphragm takes place on the surfaces of the housing and the armature.

Although this invention has been shown and described with respect to detailed embodiments thereof, it will be understood that various modifications in form and detail will suggest themselves to those skilled in the art, and it is intended by the appended claims to cover such modifications as come within the true spirit and scope of this invention.

I claim:

1. A control valve assembly of the type adapted to be operated at a high frequency with a variable duty cycle, the valve having an axis Am, which comprises:
    a housing having a cavity which extends axially within the housing, the housing further having
        a first seat disposed in the cavity,
        a second seat disposed in the cavity and spaced axially from the first seat leaving a control chamber therebetween.
        a first port which adapts the valve assembly to be in fluid communication with a fluid at a first pressure, and which is in fluid communication through the first seat with the control chamber,
        a second port which adapts the valve assembly to be in fluid communication with a region having a fluid at a second pressure which is not equal to the first pressure, and which is in fluid communication through the second seat with the control chamber,
        a third port which is in fluid communication with the control chamber;
    an integral armature having a first end and a second end, the armature extending axially about the axis Am, and being movable in a first direction to a first position and movable in a second direction to a second position, the armature having
        a poppet disposed in the control chamber which is adapted to engage the first seat at the first position of the armature and to engage the second seat at the second position of the armature,
        a plunger disposed in the cavity which is spaced axially from the poppet and which is spaced radially from the housing leaving a clearance gap Gr therebetween, and having an end spaced axially from the housing leaving an axial gap Ga therebetween, and
        a shaft which extends axially from the plunger to the poppet through one of said seats to join the poppet to the plunger;
    means for urging the poppet in one of said directions to engage one of said seats;
    a coil extending circumferentially about at least a portion of the plunger for urging the poppet in the other of said directions to engage the other of said seats; and,
    means for radially positioning the armature from the housing as the armature moves between the first seat and the second seat under operative conditions and for resisting movement of the armature in the radial direction which includes an annular diaphragm having an outer portion attached to the housing and having an inner portion attached to the armature at a location between the poppet and said first end of the armature, the diaphragm extending circumferentially about the axis Am between the armature and the housing to bound a flow path for fluid extending through the central chamber and to block the fluid from contacting said first end of the armature and the diaphragm extending axially to adapt the diaphragm to exert a centering force on the armature in response to the static pressure of the fluid as the poppet moves between the seats;
    wherein forces exerted on the armature are transmitted to the poppet to move the poppet at high frequencies from the first seat to the second seat and from the second seat to the first seat to establish an average pressure in the control chamber which is a function of time spent at each seat and between the seats, and wherein the inertia of the plunger and the means for radially positioning the armature act to resist movement of the poppet in the radial direction in response to fluid forces acting on the poppet as the poppet moves between the seats.

2. The control valve assembly of claim 1 wherein the integral armature has a first end and a second end, wherein said plunger is at the second end and wherein the means for radially positioning the armature from the housing includes means for adapting the housing to slidably engage the first end of the armature in the axial direction and to restrain the first end of the armature against movement in the radial direction.

3. The control valve assembly of claim 2 wherein the housing has a cylindrical bore which adapts the housing to slidably engage the armarture and the armature has a cylindrical projection which extends into the cylindrical bore to slidably engage the housing.

4. The control valve assembly of claim 1 wherein the fluid contains metallic particles and wherein the diaphragm blocks the fluid containing metallic particles from areas of the valve adjacent to the electromagnetic coil.

5. The control valve assembly of claim 1 wherein said diaphragm has an inner wall attached to said inner portion, an outer wall attached to said outer portion, a curved section extending between the inner wall and the outer wall, the curved section having a concave side which faces the poppet and wherein a part of the inner wall of each diaphragm is parallel to a part of the outer wall of the diaphragm for a distance equal to or greater than the distance which the poppet must travel between the seats.

6. The control valve assembly of claim 5 wherein the armature has a surface which engages the parallel part of the inner wall of the diaphragm and the housing has a surface which engages the parallel part of the outer wall of the diaphragm, wherein said surfaces are parallel to each other and are parallel to Am and are adapted to move parallel to each other as the armature oscillates between the seats under operative conditions causing the cross-sectional shape of the curved section of each diaphragm to approximate a half-circle.

7. A control valve assembly of the type adapted to be operated at a high frequency with a variable duty cycle, the valve having an axis Am, which comprises:
   a housing having a cavity which extends axially within the housing, the housing further having
      a first seat disposed in the cavity,
      a second seat disposed in the cavity and spaced axially from the first seat leaving a control chamber therebetween,
      a first flow path for fluid extending through the first seat to the control chamber,
      a first port which adapts the valve assembly to be in fluid communication with a fluid at a first pressure, and which is in fluid communication along the first flow path with the control chamber,
      a second flow path for fluid extending through the second seat to the control chamber,
      a second port which adapts the valve assembly to be in fluid communication with a region having a fluid at a second pressure which is not equal to the first pressure, and which is in fluid communication along the second flow path with the control chamber,
      a third port which is in fluid communication with the control chamber;
   an integral armature extending axially about the axis Am which has a first end, a second end, and which is movable in a first direction to a first position and movable in a second direction to a second position, the armature having
      a poppet disposed in the control chamber which is adapted to engage the first seat at the first position of the armature and to engage the second seat at the second position of the armature,
      a plunger at the second end which is disposed in the cavity, which is spaced axially from the poppet, and which is spaced radially from the housing leaving a clearance gap Gr therebetween, and having an end spaced axially from the housing leaving an axial gap therebetween,
      a shaft which extends axially from the plunger to the poppet through one of said seats to join the poppet to the plunger;
   a first means for urging the poppet in one of said directions to engage one of said seats;
   a coil extending circumferentially about at least a portion of the plunger for urging the poppet in the other of said directions to engage the other of said seats; and,
   means for radially positioning the armature as the armature moves between the seats under operative conditions which includes
      means for adapting the housing to slidably engage the first end of the armature in the axial direction and to restrain the first end of the armature against movement in the radial direction,
      a first annular diaphragm having an outer portion which is attached to the housing, having an inner portion which is attached to the armature at a location between the poppet and the first end of the armature, the diaphragm extending circumferentially about the axis Am between the armature and the housing to bound the first flow path for fluid and to block the fluid from contacting the first end of the armature;
      a second annular diaphragm having an outer portion which is attached to the housing, having an inner portion which is attached to the armature at a location between the poppet and the second end of the armature, the diaphragm extending circumferentially about the axis Am between the armature and the housing to bound the second flow path for fluid and to block the fluid from contacting the plunger on the second end of the armature;
   wherein forces exerted on the armature are transmitted to the poppet to move the poppet at high frequencies from the first seat to the second seat and from the second seat to the first seat to establish an average pressure in the control chamber which is a function of the time spent at each seat and between the seats, wherein isolation of the ends of the armature from the fluid reduces fluidic drag forces acting on the ends of the armature, and wherein the circumferentially extending diaphragms, the slidable engagement between the armature and the housing and the inertia of the plunger act to resist movement of the poppet in the radial direction in response to fluid forces acting on the poppet as the poppet moves between the seats.

8. The control valve assembly of claim 7 wherein each of said diaphragms has an inner wall attached to said inner portion, an outer wall attached to said outer portion, a curved section extending between the walls, the curved section having a concave side which faces the poppet and wherein a part of the inner wall of each diaphragm is parallel to a part of the outer wall of the diaphragm for a distance equal to or greater than the distance which the poppet must travel between the seats.

9. The control valve assembly of claim 8 wherein the curved section of at least one of said annular diaphragms is radially aligned with the line of contact between the poppet and the first seat so that the static pressure of the fluid which is flowed along the first flow path acts on the diaphragm in the first direction and on the poppet in the second direction and causes the axial force exerted on the armature by the static pressure of the fluid flowed along the first flow path to be reduced as compared with constructions in which no diaphragm opposes the static pressure of the fluid acting on the armature.

10. The control valve assembly of claim 8 wherein the armature has a surface which engages the parallel part of the inner wall of the diaphragm and the housing has a surface which engages the parallel part of the outer wall of the diaphragm wherein said surfaces are parallel to each other and are parallel to Am and are adapted to move parallel to each other as the armature is oscillated between seats under operative conditions causing the cross-sectional shape of the curved portion of each diaphragm to approximate a half-circle to reduce shearing stresses in the diaphragm under operative conditions.

11. A control valve assembly of the type adapted to be operated at a high frequency with a variable duty cycle, the valve having an axis Am, which comprises:
- a housing having a cavity which extends axially within the housing, the housing further having
  - a first seat disposed in the cavity,
  - a second seat disposed in the cavity and spaced axially from the first seat leaving a control chamber therebetween,
  - a first port which adapts the valve assembly to be in fluid communication with a fluid at a first pressure, and which is in fluid communication through the first seat with the control chamber,
  - a second port which adapts the valve assembly to be in fluid communication with a region having a fluid at a second pressure which is not equal to the first pressure, and which is in fluid communication through the second seat with the control chamber,
  - a third port which is in fluid communication with the control chamber such that a first flow path for fluid extends through the first seat to the control chamber to place the first port in fluid communication with the control chamber and a second flow path extends through the second seat to the control chamber to place the second port in fluid communication with the control chamber;
- an integral armature having a first end and a second end, the armature extending axially about the axis Am, and being movable in a first direction to a first position and movable in a second direction to a second position, the armature having
  - a poppet disposed in the control chamber which is adapted to engage the first seat at the first position of the armature and to engage the second seat at the second position of the armature,
  - a plunger disposed in the cavity which is spaced axially from the poppet and which is spaced radially from the housing leaving a clearance gap Gr therebetween, and having an end spaced axially from the housing leaving an axial gap Ga therebetween, and
  - a shaft which extends axially from the plunger to the poppet through one of said seats to join the poppet to the plunger;
- means for urging the poppet in one of said directions to engage one of said seats;
- a coil extending circumferentially about at least a portion of the plunger for urging the poppet in the other of said directions to engage the other of said seats; and,
- means for radially positioning the armature from the housing as the armature moves between the first seat and the second seat under operative conditions and for resisting movement of the armature in the radial direction which includes an annular diaphragm having an outer portion attached to the housing, having an inner portion attached to the armature at a location between the poppet and said first end of the armature and having a curved section extending between the outer portion and the inner portion of the diaphragm, the diaphragm extending circumferentially about the axis Am between the armature and the housing to bound said first flow path for fluid and to block the fluid from contacting said first end of the armature;

wherein forces exerted on the armature are transmitted to the poppet to move the poppet at high frequencies from the first seat to the second seat and from the second seat to the first seat to establish an average pressure in the control chamber which is a function of time spent at each seat and between the seats, wherein the inertia of the plunger and the means for radially positioning the armature act to resist movement of the poppet in the radial direction in response to fluid forces acting on the poppet as the poppet moves between the seats, and wherein the curved section of the annular diaphragm is radially aligned with the line of contact between the poppet and the first seat so that the static pressure of the fluid which is flowed along the first flow path acts on the diaphragm in one of said directions and on the poppet in the other of said directions and causes the axial force exerted by the static pressure of the fluid along the first flow path on the armature under operative conditions to be reduced as compared with constructions in which no diaphragm opposes the static pressure of the fluid acting on the poppet.

* * * * *